United States Patent [19]

Korger

[11] 4,190,288
[45] Feb. 26, 1980

[54] BACK-HOLDING DEVICE FOR AUXILIARY SEATS, PARTICULARLY CHILDREN'S SEATS, TO BE PLACED ON CONVENTIONAL VEHICLE SEATS

[75] Inventor: Heinz Korger, Niederstotzingen, Fed. Rep. of Germany

[73] Assignee: Carl Stahl GmbH & Co. KG, Herbrechtingen, Fed. Rep. of Germany

[21] Appl. No.: 911,914

[22] Filed: Jun. 2, 1978

[30] Foreign Application Priority Data

Jun. 7, 1977 [DE] Fed. Rep. of Germany ....... 2725577

[51] Int. Cl.² ........................ B60R 21/10; A62B 35/00
[52] U.S. Cl. .................................... 297/488; 280/748; 297/216
[58] Field of Search ............... 297/390, 384, 385, 216, 297/250, 748; 280/748, 744, 745, 747

[56] References Cited

U.S. PATENT DOCUMENTS

| | | | |
|---|---|---|---|
| 3,198,543 | 8/1965 | Presunka | 297/390 X |
| 3,764,159 | 10/1973 | Grime | 297/390 |
| 3,888,329 | 6/1975 | Mowaghan | 297/390 X |
| 3,975,037 | 8/1976 | Hontschik | 297/390 X |
| 4,067,608 | 1/1978 | von Wimmersperg | 297/390 X |
| 4,076,307 | 2/1978 | Namba et al. | 297/390 X |
| 4,082,350 | 4/1978 | Tomforde | 297/390 X |

FOREIGN PATENT DOCUMENTS

| | | | |
|---|---|---|---|
| 2147248 | 3/1973 | Fed. Rep. of Germany | 297/216 |
| 2232895 | 1/1974 | Fed. Rep. of Germany | 297/390 |
| 2551843 | 3/1977 | Fed. Rep. of Germany | 297/390 |
| 2611155 | 9/1977 | Fed. Rep. of Germany | 297/390 |
| 1338252 | 8/1963 | France | 297/390 |
| 610539 | 10/1960 | Italy | 280/748 |
| 1432592 | 4/1976 | United Kingdom | 297/390 |

Primary Examiner—James T. McCall
Attorney, Agent, or Firm—Toren, McGeady and Stanger

[57] ABSTRACT

In a safety restraining device useful as a child's seat for a motor vehicle, a first restraining body is pivotally mounted for movement from a first position where a child has freedom of movement and can use the body as a table surface, to a second position where the body prevents the forward movement of the child's upper body when a sudden strong deceleration of the vehicle occurs. A flywheel mass mounted in the first restraining body or in an associated side member effects the movement of the first restraining body into the second position. In addition, a stationary second restraining body cooperates with the first restraining body to hold the legs and pelvic region of the child when the first restraining body moves to the second position.

14 Claims, 7 Drawing Figures

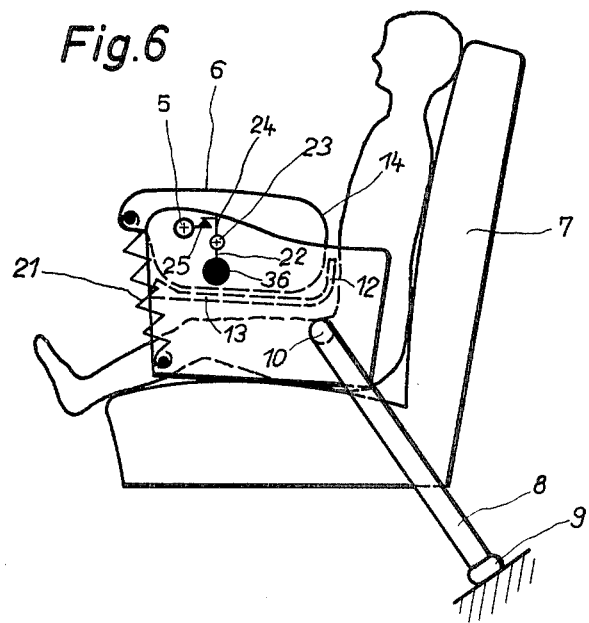
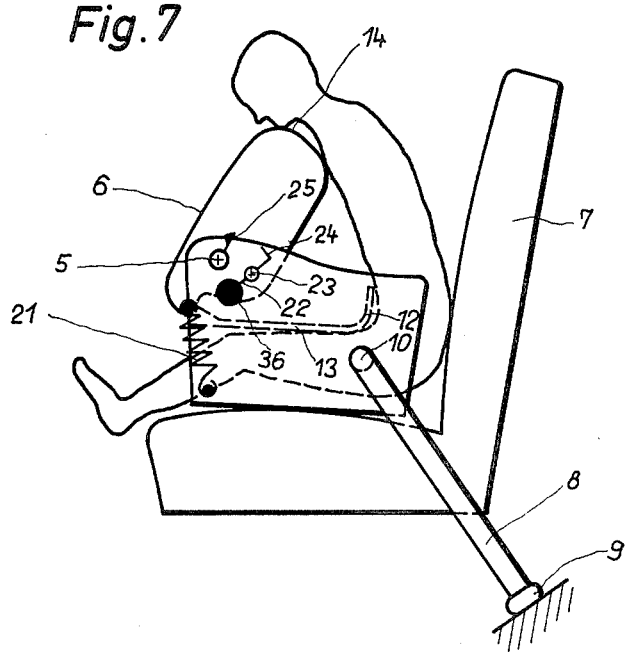

BACK-HOLDING DEVICE FOR AUXILIARY SEATS, PARTICULARLY CHILDREN'S SEATS, TO BE PLACED ON CONVENTIONAL VEHICLE SEATS

The invention relates to a back-holding or safety restraining device for auxiliary seats to be placed on conventional vehicle seats, particularly to a child's seat for motor vehicles. The child's seat is constructed as a contoured seat, has at least one seat area and rigid side members with arm rests, can be fastened by means of a belt at anchoring means in the vehicle body, and its back-holding device comprises a catch body. The catch body can pivot about a shaft which extends perpendicularly to the seat, is located horizontally in front of the child's abdomen in the manner of a table surface when it is in its unloaded normal position, and, in the case of an accident, can automatically be brought into an upright back-holding position as a result of the sudden strong deceleration of the vehicle.

In the effort to secure all passengers of a motor vehicle as much as possible against injuries in the case of an accident of the vehicle, children's seats have already been created which are provided with back-holding devices, which can be placed on the existing normal vehicle seat and can be anchored in the vehicle by means of a belt. Depending on their design, these known children's seats are provided with various kinds of back-holding devices.

In one of the best known designs of children's seats for motor vehicles, the back-holding device is formed by belts, for example, arranged in the form of suspenders, which, as is well known, have an excellent back-holding ability when worn correctly. Aside from the fact that particularly this belt arrangement is very cumbersome to fasten and, when worn correctly, unduly limits the child's freedom of movement, it offers no possibility to counteract the forward movement of the child's head which occurs during an accident. Therefore, when this belt arrangement is used as a back-holding device, injuries to the cervical spinal column can still occur.

In another known design of back-holding devices for children's seats, a fixedly arranged catch body of permanently deformable material is provided. The catch body is usually supported on the arm rests of the child's seat and has an essentially plane, table-like surface. The front wall of this catch body facing toward the child and forming the impact surface, is dimensioned in respect to its height in such a way that the back-holding force is distributed over the child's pelvis and chest. The disadvantage of this known back-holding device is that the catch body has to have a very large height if its back-holding effect is to be sufficient which, in turn, results in the fact that the child's freedom of movement is unduly limited. Another disadvantage is that the catch body can also in this case not prevent an excessive forward movement of the child's head.

Finally, a back-holding device, particularly for children's seats, has become known wherein, to avoid an excessive forward movement of the child during an accident, a movable catch body, or at least a movable part of of a catch body, is guided from an essentially horizontal normal position in an upward movement toward the chest of the child to be secured as a result of the back-holding forces occurring during the accident, the forces being transmitted through the belt which holds the child's seat through anchoring means which are fixed to the vehicle. In this case, the catch body is essentially constructed in the shape of a plate and is supported in the side members or arm rests of the child's seat so as to be pivotable about an axis extending immediately in front of the child; furthermore, the belts holding the child's seat in its normal position on the vehicle seat are connected to steering levers which, as a result of the tensile forces created in the belts, lead to an upward movement of the catch body into a steeply upwardly inclined position. However, the intended upward movement of the catch body can be achieved in this known child's seat only when the child's seat is moved forwardly in the case of an accident by the length of the levers which effect the upward movement of the catch body. However, a back-holding device to be used in vehicles, no matter what its design, can only have an optimum and gentle back-holding effect when it is able to decelerate the passengers simultaneously and uniformly together with the vehicle, i.e., the back-holding effect must start immediately at the beginning of the deceleration of the vehicle, since only under this condition the available braking distance can be fully utilized, this braking distance being extremely short and, as a rule, being formed only by the own deformation of the vehicle. When the back-holding effect starts with a more or less long time lag relative to the beginning of the deceleration of the vehicle, this must necessarily lead to more or less high peak forces in the back-holding device since the relative movement of the person to be secured which begins at the beginning of the deceleration of the vehicle must additionally be decelerated by means of the back-holding device at the moment the back-holding device becomes effective. However, this is exactly the case in the known design of a back-holding device for children's seats mentioned last, since its catch body only reaches its effective position when already a significant forward movement of the child including the child's seat relative to the vehicle seat has taken place. The obvious result of this manner of operation of the known back-holding device is that not only the back-holding force resulting from the deceleration of the vehicle caused by the accident must be transmitted to the child through the catch body moved into its effective position, but that additionally the already occurred relative movement between child or child's seat or vehicle must be instantly decelerated by means of the catch body. In the case of an accident, this necessarily results in very high peak forces at the moment of decelerating the already occurred relative movement between child and vehicle. This is especially disadvantageous because in this known back-holding device a catch body is provided which is limited to a relatively small surface area and can only act on the chest or the upper part of the body of the child. The pelvis is not held back in this known back-holding device. Another disadvantage of the known device is that the back-holding device is actuated by forces which depend on deceleration, the forces acting in the seat mounting support and particularly in the belts, whereby the back-holding device is actuated in an undesirable manner during braking maneuvers which are not dangerous or as a result of movement of the person which is secured by the belts.

Starting from this prior art, the invention is based on the task to create auxiliary seats, particularly children's seats for motor vehicles to be placed on conventional vehicle seats. The back-holding device is to facilitate, without externally arranged movable parts and while ensuring a best possible comfort in the normal position, a back-holding effect which starts simultaneously and uniformly with the deceleration of the vehicle in the case of an accident, whereby the back-holding forces are distributed as uniformly as possible over the body of the child.

In a back-holding device of the above-mentioned type this task is solved according to the invention thereby that an adjustable catch body is arranged above a stationary back-holding device, the catch body being pivotable about a shaft which is supported in the region of the forward ends of the arm rests or side members of the seat bucket, and that at least one flywheel mass is provided which is arranged within the side members of the seat or within the catch body, the flywheel mass reacting to excessive decelerations of the vehicle and serving for the direct or indirect adjustment of the catch body into its back-holding position.

The use of a flywheel or inertial mass for adjusting the catch body into its back-holding position ensures that the catch body is moved into its effective position simultaneously and uniformly with the deceleration of the vehicle and that, thus, in the inventive back-holding device the back-holding effect starts practically without any time lag relative to the deceleration of the vehicle. This action of the back-holding device without time lag relative to the deceleration of the vehicle cannot be realized in any of the known designs of back-holding devices, particularly in children's seats. Moreover, the inventive design of a back-holding device has the attractive advantage that it can be manufactured in a very simple manner and that it can be completely accommodated in parts of the seat bucket or the catch body which are lined on both sides. Under certain conditions, this positive effect of using the flywheel or inertial mass is also possible where the adjustment of the catch body into its back-holding position is supported or forced by means of an accumulator.

It is known to use inertial masses as collision sensors, particularly for actuating such back-holding devices as, for example, air bags. However, in all known cases the inertial masses are used only to actuate a switch which, in turn, through a more or less complicated hydraulic supply system, causes the respective back-holding device to reach its effective position. This leads to a time lag which, as short as it may be, results in the above-explained non-uniform deceleration of vehicle and passengers.

Another significant advantage of the inventive back-holding device is to be seen in the fact that, on the one hand, it acts on the pelvis region of the child through a stationary part, and, on the other hand, supports the check region of the child through the catch body which can be moved upwardly, so that all back-holding forces are distributed over a very large body area. To ensure a secure support, particularly through the adjustable catch body, according to another very important feature of the present invention it is provided that the rotating shaft of the catch body is arranged at such a height in the side members or arm rests of the seat that the impact forces generated during an accident are directed directly through the shaft of the catch body. This results in the advantage that the catch body, even under the effect of relatively large impact forces, cannot tilt upwardly or downwardly and that, thus, an absolutely secure support of the impact forces is ensured.

To complete the invention even further, the catch body in its totality is constructed with a relatively large volume and particularly the rear end surface of the adjustable catch body forming the impact surface has a large surface area; in addition, the catch body is arranged in such a manner that in the normal position a certain freedom of movement in front of the child's abdomen is available. As a result, when the catch body is in its normal position, its upper surface forms a table surface immediately in front of the child so that the child can deposit toys on it or can use it for playing.

A plurality of embodiments of the invention is available for its practical realization.

A preferred embodiment of the inventive back-holding device is essentially characterized in that to the catch body a flywheel or inertial mass is assigned which pivots about its rotating shaft, the magnitude of the mass being sufficient for adjusting the catch body into its back-holding position without any auxiliary means. In this case, the flywheel or inertial mass can be accommodated, at a vertical and horizontal distance from its shaft, in an extension of the catch body which projects toward the front beyond the shaft, and the catch body can be covered with a padding which eliminates the danger of injuries.

Another especially advantageous embodiment of the invention is characterized in that to a catch body which pivots freely about its shaft at least one flywheel mass is assigned which mass is arranged in one of the side members of the seat bucket and can pivot about an axis which is parallel to its shaft, wherein the flywheel mass is suspended in the manner of a pendulum through a swivel arm and wherein the flywheel mass interacts, through gearing elements formed of a transmission lever and an actuating arm at the catch body, with the catch body in such a manner that a positive movement of the flywheel mass immediately effects the adjustment of the catch body into its back-holding position. In this case, it is advantageous that the swivel and transmission levers form a high transmission ratio with the actuating arm, so that the catch body is moved immediately and quickly into its back-holding position by means of the flywheel mass, when, as might possibly be taken into consideration, the actuating arm is connected directly to the shaft of the catch body.

In addition to the preferred embodiments of the invention discussed hereinabove, it may also be advantageous to assign a force accumulator to the task of adjusting the catch body into its back-holding position. Tht accumulator is prestressed and locked when the catch body is in its normal position. In this case, a flywheel mass preferably accommodated in the side members of the seat bucket serves at least essentially to actuate the accumulator which pivots the catch body into its adjusted back-holding position. The accumulator advantageously consists of a prestressed adjusting spring which is locked when the catch body is in its normal position, the locking being releasable by means of the flywheel mass. It is considered particularly advantageous that the adjusting spring assigned to the catch body is constructed as a tension spring which is prestressed when the catch body is in its normal position and is arranged within one of the side members of the seat bucket together with the locking device assigned to the spring, the spring acting at the catch body a distance in front of its shaft. In the normal case, the locking device consists of a flywheel or inertial mass pivotally suspended through a swivel arm about an axis which is parallel to the shaft of the catch body and of a locking lever connected to the flywheel mass as well as of a projection of the catch body or the shaft of the catch body, the projection acting on the locking lever. To obtain a certain threshold value which prevents a premature releasing of the catch body adjustment when merely an unusual deceleration of the vehicle takes place, according to another feature of the invention it may be provided that one of the surfaces which include the surface of the rocking lever or the surface of the catch body projecting or the locking projection arranged at the shaft of the catch body is constructed as a curved track in such a manner that a release of the accumulator effecting the adjustment of the catch body into its back-holding position is only possible when a vehicle deceleration occurs which is in excess of the normal deceleration values of the vehicle.

As already mentioned in the introduction of the specification of the subject matter of the present invention, it is advantageous that to a catch body which automatically pivots into its back-holding position there is assigned another back-holding body which does not pivot automatically, whereby the back-holding body which is not automatically adjustable is arranged underneath the adjustable catch body and is provided with an essentially L-shaped cross-section. In this case, the non-adjustable back-holding body is arranged in the region of the child's pelvis and forms with its shorter arm an impact surface which is located approximately in front of the child's pelvis. This impact surface extends the impact surface of the catch body which has pivoted into its back-holding position downwardly in such a manner that the impact forces in the case of an accident are distributed over a very large surface of the child's body. The longer arm of the back-holding body which is not automatically adjustable serves to hold down the thighs of the child so that the child cannot be moved upwardly about an axis of rotation which is formed by the knees or heels. This has the advantage that the optimum effectiveness of the adjustable catch body is ensured under all circumstances, since the adjustable catch body must necessarily interact with the child's chest or upper part of the body because the upward movement of the child is eliminated.

The invention is described in the following with the aid of three embodiments shown in the drawing.

In the drawing:

FIG. 6 shows a side view of a child's seat with an inventive back-holding device in its normal position;

FIG. 7 also shows a side view of a child's seat with an inventive back-holding device according to FIG. 6, however, with the back-holding device being in its effective position.

Figure 1:
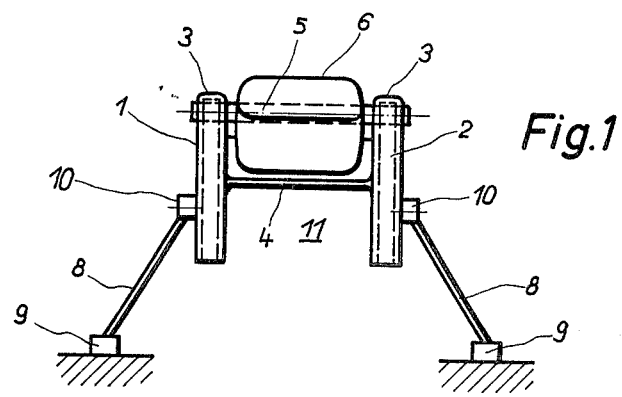
FIG. 1 shows a more or less schematical front view of a child's seat for motor vehicles with a back-holding or safety restraining device according to the invention.
Figure 2:
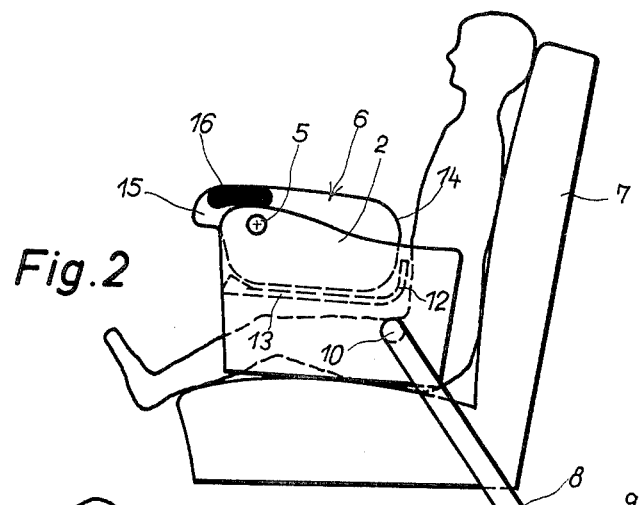
FIG. 2 shows a side view of a first embodiment of a child's seat with an inventive back-holding device in its normal position.
Figure 3:
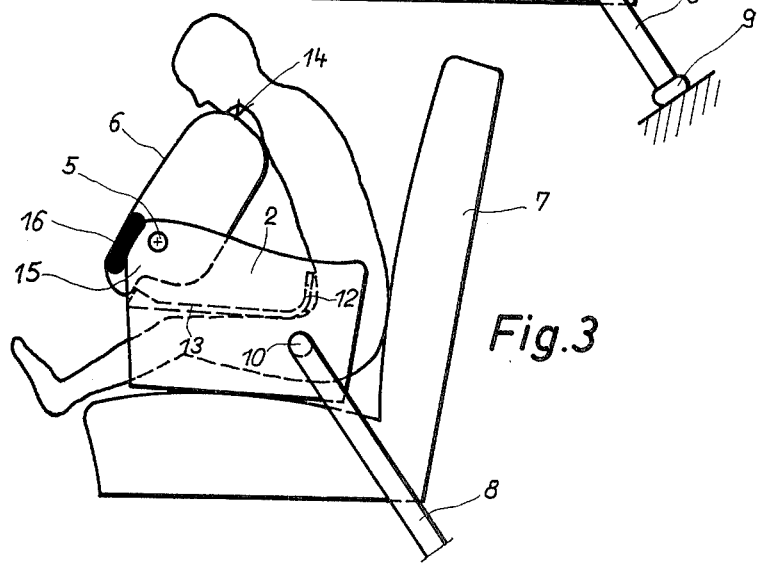
FIG. 3 shows a side view of a child's seat with an inventive back-holding device in its swung-up back-holding position.

The child's seat more or less schematically shown in FIG. 1 comprises two side members 1 and 2 whose upper ends form arm rests 3. Approximately at the half-way point in vertical direction there is arranged between the portions of the side members 1 and 2 forming at their upper ends the arm rests 3 a non-adjustable back-holding or restraining body 4. Above the back-holding body 4 there is arranged a catch or restraining body 6 which can be pivoted about a horizontal shaft 5 from a normal position into an effective position. The child's seat can in its totality be placed on an existing conventional vehicle seat 7 and can be fastened through supporting belts 8 to anchoring members arranged at the vehicle body. Through appropriately designed connecting devices 10, the supporting belts are rigidly fastened to the child's seat so that the latter can be irreversibly fixed in a normal position through the supporting belts 8 on an existing vehicle seat 7. As particularly the representation of FIG. 1 shows, the child's seat has essentially a H-shaped cross section, wherein the free space between the two upper portions of its two longitudinal arms is occupied by the catch body 6, while the free space 11 between the two lower halves of its longitudinal arms surrounds the child's thighs (See FIG. 2). The stationary back-holding body 4 is of uniform shape in all shown embodiments of the invention and has an essentially L-shaped cross section, whereby it forms with its shorter arm 12 a back-holding surface which is parallel to the child's pelvis, while its longer arm 13 holds down the child's thighs which are resting in the free space 11 of the child's seat. As all figures show, above the non-adjustable back-holding body 4 there is arranged an adjustable catch body 6 which pivots about a shaft 5. In respect to its vertical location in the seat frame and in respect to its distance from the end face 14 of the back-holding body 6 forming the impact surface, the shaft 5 is arranged in such a manner that the impact forces acting in the case of an accident on the back-holding body 6 will always go through the shaft 5. As a result, the catch body 6 will not under any circumstances be deflected from its swung-up effective position. The catch body 6, in turn, has a relatively large volume, so that its rear end face 14 forming the impact surface has a large area and is, thus, particularly suited to receive the back-holding forces over a large area. Moreover, when the catch body 6 is in its normal position, its rear end face 14 is located directly in front of the child's abdomen while allowing a certain freedom of movement. In the preferred embodiment of the invention shown in FIGS. 2 and 3, a flywheel mass 16 is arranged in front of and above the shaft 5 in the projection 15 of the catch body 6. The flywheel mass 16, due to its inertial, has the effect that the catch body 6 is adjusted into its back-holding position shown in FIG. 3 when an unusual deceleration of a vehicle occurs. This adjustment of the catch body 6, due to the effect of the flywheel or inertial mass, takes place simultaneously and uniformly with the deceleration of the vehicle, so that the catch body 6 is swung into its effective position already at the beginning of the deceleration of the vehicle and, thus, a time lag between the back-holding effect of the back-holding device and the deceleration of the vehicle is prevented.

Figure 4:
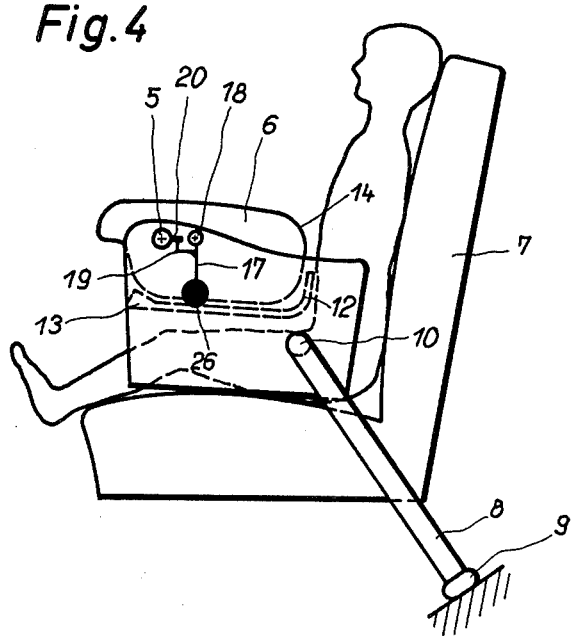
FIG. 4 shows a side view of another embodiment of the inventive back-holding device in a child's seat for motor vehicles, in its normal position.
Figure 5:
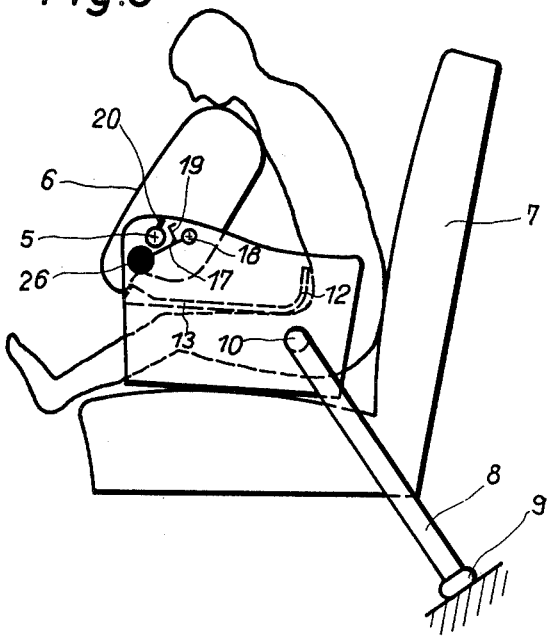
FIG. 5 shows an inventive back-holding device in a child's seat according to FIG. 4 in its swung-up effective position.

FIGS. 4 and 5 show another embodiment of the invention, which is also to be used in connection with the above-described embodiment of a child's seat. In this case, the adjustment of the catch body 6 from its normal position shown in FIG. 4 into the back-holding position shown in FIG. 5 also takes place directly and immediately as a result of the effect of a flywheel or inertial mass 26. In the shown embodiment, the flywheel or inertial mass 26 is suspended within one of the side wall members 1 or 2 of the seat in the manner of a pendulum through a swivel arm 17 and is pivotable about an axis 18 which is parallel to the shaft 5 of the catch body 6. With a short distance to the axis 18, a transmission lever 19 is arranged at the swivel arm 17 of the flywheel or inertial mass 26. The transmission lever 19 acts on an actuating arm 20 which, in turn, is immediately connected to the shaft 5 of the catch body 6. In this case, the transmission lever 19 and the actuating arm 20 form gearing members which, due to their immediate interaction with the catch body 6, force an adjustment of the catch body 6 into its back-holding position, the adjustment being immediately dependent from the deceleration of the vehicle. In this embodiment of the invention, the catch body 6 is swung into its back-holding position under the immediate effect of the flywheel or inertial mass 26. It is particularly advantageous that the swivel arm 17 and the transmission lever 19 form a high transmission ratio with the actuating arm 20.

FIGS. 6 and 7 show a modified embodiment of the invention which is particularly characterized in that additionally an accumulator, particularly a tension spring 21, is used to at least support the adjustment movement of the catch body 6 into its effective position. The tension spring 21 is prestressed and locked in this prestressed state when the catch body 6 is in its normal position, whereby the locking of the tension spring 21 takes place from a flywheel or inertial mass 36 which is suspended through a swivel arm 22 and pivotable about an axis 23 which is parallel to the shaft 5 of the catch body. A locking lever 24 is connected in respect to the axis 23 opposite the flywheel or inertial mass 36 to the swivel arm 22. The locking lever 24 acts on a projection 25 of the catch body 6 or the shaft 5 of the catch body. Thus, it is ensured that, when the projection 25 of the shaft 5 of the catch body is released, the catch body 6 is very quickly moved into its swung-up back-holding position under the effect of the tension spring 21 acting at the catch body 6 at a distance from the shaft 5 of the catch body. In this case, the adjustment of the catch body 6 into its swung-up back-holding position also takes place in dependence on the flywheel or inertial mass 36 which reacts only to the deceleration of the vehicle. Accordingly, also in this embodiment it is ensured that the adjustment of the catch body 6 into its back-holding position takes place exclusively and immediately in dependence on the actual deceleration of the vehicle. The tension spring 21 and the locking device 22 to 25 are also in this embodiment accommodated within one of the side walls 1 or 2 of the child's seat.

I claim:

1. A safety restraining device for use with a conventional vehicle seat, such as for a child, comprising a pair of rigid side members spaced laterally apart in the direction transverse to the normal direction of movement of a vehicle, said side members extending in the normal direction of movement of a vehicle and having a front end facing in the normal forward direction of movement and an oppositely directed rear end with an upper surface and a lower surface extending between said front end and rear end, means for securing said side members to a vehicle body, a first restraining body located between said side members and pivotally mounted about an axis extending between said side members and transversely of the normal direction of movement of a vehicle, said first restraining body being pivotally displaceable between a first position where a child seated in the device has freedom of movement and a second position where forward movement in the normal direction of movement is restrained, in the first position said restraining body having a front end facing in the normal forward direction of movement of a vehicle and a rear end facing in the opposite direction with an upwardly facing surface extending between the front and rear ends thereof and forming a horizontal table surface and a downwardly facing surface spaced below said upwardly facing surface, the rear end of said first restraining body being located between the front and rear ends of said side members and the downwardly facing surface of said first restraining body being spaced upwardly from the lower surface of said side members so that a space is provided between the rear end of said first restraining body and the rear ends of said side members and between the downwardly facing surface of said first restraining body and the lower surface of said side members for seating a child with his legs located below the downwardly facing surface and projecting toward the front ends of said side members, said first restraining body being pivotally displaceable into the second position with said upwardly facing surface and downwardly facing surface extending upwardly when a sudden strong deceleration of the vehicle takes place, such as occurs in the case of an accident, wherein the improvement comprises a stationary second restraining body positioned between said side members and below said first restraining body, a horizontal first shaft pivotally mounting said first restraining body and extending between said side members adjacent the front ends thereof, said first restraining body being pivotally movable about said first shaft between the first and second positions thereof, said first shaft being positioned so that impact forces directed against said first restraining body in the second position thereof pass through said first shaft and a flywheel mass located in one of said first restraining body and said side members and arranged for automatically pivotally displacing said first restraining body from the first position into the second position upon a sudden strong deceleration of the vehicle.

2. A safety restraining device, as set forth in claim 1, wherein said first shaft is located forwardly of the middle of said first restraining body between the front and rear ends thereof and adjacent the upper surface of said side members so that impact forces occurring when said first restraining body is in the second position pass through the shaft.

3. A safety restraining device, as set forth in claim 1, wherein the rear end surface of said first restraining body has a large area and forms an impact surface when said first restraining body is in the second position, and when said first restraining body is in the first position said rear end surface is spaced forwardly of the rear ends of said side members affording adequate space for a child to be seated with his upper body rearwardly of the rear end surface so that the child has freedom of movement.

4. A safety restraining device, as set forth in claim 1, wherein said flywheel mass is located within said first restraining body above and with a major portion thereof located forwardly of said shaft and said flywheel mass has a sufficient magnitude on its own to effect the pivotal displacement of said first restraining body into the second position.

5. A safety restraining device, as set forth in claim 1, wherein the front end of said first restraining body at the upwardly facing surface thereof has a forwardly extending projection and said first restraining body is positioned at least in part within said projection with the major portion of said flywheel mass located forwardly of said shaft.

6. A safety restraining device, as set forth in claim 4, wherein padding covers said flywheel mass within said first restraining body.

7. A safety restraining device, as set forth in claim 1, wherein one said flywheel mass is located in at least one of said side members, a second shaft positioned parallel to and spaced closely from said first shaft, and said flywheel mass pivotally mounted on said second shaft.

8. A safety restraining device, as set forth in claim 7, wherein said flywheel mass depends from said second shaft, transmission means interconnecting said flywheel mass and said first shaft for effecting the pivotal displacement of said first restraining body.

9. A safety restraining device, as set forth in claim 8, wherein said transmission means comprises an arm depending downwardly from said second shaft with said flywheel mass attached to the lower end of said arm, a transmission lever connected to said arm and projecting transversely thereof toward said first shaft, an actuating arm attached to said first shaft and projecting toward said second shaft, said transmission lever being interengaged with said actuating arm and said arm and transmission lever forming a high transmission ratio with said actuating arm.

10. A safety restraining device, as set forth in claim 1, including an adjusting spring secured to said first restraining body for assisting the movement of said first restraining body from the first position to the second position, in the first position said spring being stressed and secured against displacement until released by said flywheel mass as a result of a sudden strong deceleration of the vehicle.

11. A safety restraining device, as set forth in claim 10, wherein said flywheel mass is located within one of said side members, said adjusting spring comprises a tension spring secured at one end to said first restraining body and at the other end to the one of said side members containing said flywheel mass and means for locking said adjusting spring located within the one of said side members, said spring secured to said first restraining body forwardly of said first shaft and said flywheel mass located rearwardly of said first shaft.

12. A safety restraining device, as set forth in claim 11, wherein said locking means comprises a second shaft arranged parallel to and spaced rearwardly from said first shaft relative to the normal forward direction of movement of the vehicle, a swivel arm depending from said second shaft, a locking lever attached to said second shaft and projecting therefrom toward said first shaft, a projection on said first shaft extending toward said locking lever and said locking lever and projection being interegaged in the first position of said first restraining body for affording the locking action.

13. A safety restraining device, as set forth in claim 12, wherein one of the surfaces of said locking lever and said projection has the form of a curved track for obtaining a threshold value.

14. A safety restraining device, as set forth in claim 1, wherein said second restraining body is positioned below said first restraining body and has an L-shaped cross section having a generally horizontal first leg extending in the normal direction of movement of the vehicle and a vertical second leg extending upwardly from said first leg at the end thereof closer to the rear end of said side members, said horizontal leg located below the downwardly facing surface of said first restraining body and in the first position of said first restraining body, said vertical leg is located rearwardly of the rear end of said first restraining body and extends upwardly from said horizontal leg to a position intermediate the upwardly facing and downwardly facing surfaces of said first restraining body so that said horizontal leg serves to hold down a child's thighs while said vertical leg is located approximately in front of the child's pelvis.

* * * * *